United States Patent
Pratt et al.

(10) Patent No.: US 11,258,987 B2
(45) Date of Patent: Feb. 22, 2022

(54) ANTI-COLLISION AND MOTION CONTROL SYSTEMS AND METHODS

(71) Applicant: The Marsden Group, Houston, TX (US)

(72) Inventors: Andrew James Pratt, Houston, TX (US); Monil Dinesh Morar, Houston, TX (US); Nolan Grant Moore, Houston, TX (US); Mark Alan Foresman, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/570,689

(22) Filed: Sep. 13, 2019

(65) Prior Publication Data
US 2020/0099893 A1 Mar. 26, 2020

Related U.S. Application Data (60) Provisional application No. 62/859,533, filed on Jun. 10, 2019, provisional application No. 62/734,458, filed on Sep. 21, 2018.

(51) Int. Cl.
*H04N 7/18* (2006.01)
*H04N 5/247* (2006.01)
(Continued)

(52) U.S. Cl.
CPC .......... *H04N 7/181* (2013.01); *G01S 7/4802* (2013.01); *G01S 17/86* (2020.01); *G01S 17/93* (2013.01);
(Continued)

(58) Field of Classification Search
CPC ........ H04N 7/181; H04N 5/247; G01S 17/86; G01S 17/4802; G01S 17/93; G06K 9/00805; G06K 9/6267
(Continued)

(56) References Cited

U.S. PATENT DOCUMENTS

| 6,820,702 B2 | 11/2004 | Niedermayr et al. |
| 6,892,812 B2 | 5/2005 | Niedermayr et al. |

(Continued)

FOREIGN PATENT DOCUMENTS

| CN | 107610269 A | 1/2018 |
| EP | 2380709 A2 | 10/2011 |

(Continued)

OTHER PUBLICATIONS

International Search Report and Written Opinion from PCT Application No. PCT/US2019/051336, dated Dec. 11, 2019, 13 pgs.

(Continued)

*Primary Examiner* — Michael Lee
(74) *Attorney, Agent, or Firm* — NovoTechIP International PLLC (57) ABSTRACT

Systems and methods presented herein include an anti-collision and motion monitoring system includes one or more light detection and ranging (LiDAR) systems configured to detect locations of one or more objects in an environment. The anti-collision and motion monitoring system also includes one or more camera systems configured to capture images of the one or more objects in the environment that are detected by the one or more LiDAR systems. The anti-collision and motion monitoring system further includes processing circuitry configured to coordinate operation of the one or more LiDAR systems and the one or more camera systems, to receive inputs from the one or more LiDAR systems and the one or more camera systems relating to the one or more objects in the environment, to process the inputs received from the one or more LiDAR systems and the one or more camera systems to determine outputs relating to control of at least one of the one or more objects in the environment, and to communicate the outputs to a central coordinator to control one or more operating (Continued)

parameters of at least one of the one or more objects in the environment based at least in part on the inputs received from the one or more LiDAR systems and the one or more camera systems.

20 Claims, 5 Drawing Sheets (51) Int. Cl.
G06K 9/62 (2022.01)
G06K 9/00 (2022.01)
G01S 7/48 (2006.01)
G01S 17/93 (2020.01)
G01S 17/86 (2020.01)

(52) U.S. Cl.
CPC ....... *G06K 9/00805* (2013.01); *G06K 9/6267* (2013.01); *H04N 5/247* (2013.01)

(58) Field of Classification Search
USPC .......................................................... 348/148
See application file for complete search history.

(56) References Cited

U.S. PATENT DOCUMENTS

| | | | |
|---|---|---|---|
| 7,412,861 B2 | 8/2008 | Lohmann | |
| 8,063,780 B2 | 11/2011 | Onishi | |
| 8,115,650 B2 | 2/2012 | Dasilva et al. | |
| 9,143,843 B2 | 9/2015 | De Luca et al. | |
| 9,396,398 B2 | 7/2016 | Kozicz et al. | |
| 9,596,451 B2 | 3/2017 | Walter et al. | |
| 9,639,725 B1 | 5/2017 | Maricic et al. | |
| 9,694,879 B2 | 7/2017 | Maidla et al. | |
| 9,703,290 B1 | 7/2017 | Vandapel et al. | |
| 9,706,185 B2 | 7/2017 | Ellis | |
| 9,762,864 B2 | 9/2017 | Norland et al. | |
| 9,896,170 B1 | 2/2018 | Assal | |
| 10,099,372 B2 | 10/2018 | Vu et al. | |
| 10,107,679 B2 | 10/2018 | Haberer et al. | |
| 10,118,548 B1* | 11/2018 | Fields ................... B60Q 5/005 | |
| 10,228,232 B2 | 3/2019 | Friend et al. | |
| 10,402,662 B2 | 9/2019 | Kozicz et al. | |
| 10,445,944 B2 | 10/2019 | Galera et al. | |
| 10,452,939 B2 | 10/2019 | Tani et al. | |
| 2012/0081544 A1* | 4/2012 | Wee ..................... G01S 17/894 348/140 |
| 2013/0201052 A1 | 8/2013 | Saint Clair et al. |
| 2015/0269427 A1 | 9/2015 | Kim et al. |
| 2017/0094530 A1* | 3/2017 | Ross ..................... H04W 16/18 |
| 2017/0154223 A1 | 6/2017 | Maali et al. |
| 2017/0197313 A1 | 7/2017 | Nishino |
| 2017/0255193 A1 | 9/2017 | Berg et al. |
| 2017/0270579 A1 | 9/2017 | Ridao Carlini et al. |
| 2018/0096277 A1 | 4/2018 | Maidla et al. |
| 2018/0172828 A1 | 6/2018 | Moody et al. |
| 2018/0222051 A1 | 8/2018 | Vu et al. |
| 2018/0222052 A1 | 8/2018 | Vu et al. |
| 2018/0232593 A1 | 8/2018 | Tani et al. |
| 2018/0251199 A1 | 9/2018 | Radford et al. |
| 2018/0347752 A1 | 12/2018 | Costello et al. |
| 2018/0364693 A1 | 12/2018 | Harshbarger |
| 2019/0061158 A1 | 2/2019 | Vu et al. |
| 2019/0174149 A1* | 6/2019 | Zhang ................ H04N 21/2187 |
| 2019/0213525 A1 | 7/2019 | Haci et al. |
| 2019/0291723 A1* | 9/2019 | Srivatsa ................ G06T 19/006 |
| 2019/0340909 A1 | 11/2019 | Nguyen et al. |
| 2019/0385463 A1* | 12/2019 | Cantrell ............... G05D 1/1064 |
| 2020/0386887 A1* | 12/2020 | Pratt ..................... G01S 17/86 |

FOREIGN PATENT DOCUMENTS

| | | |
|---|---|---|
| NL | 2020067 B1 | 6/2019 |
| NL | 2020707 B1 | 10/2019 |
| WO | 2016178069 A1 | 11/2016 |
| WO | 2017093197 A1 | 6/2017 |
| WO | 2018164581 A1 | 9/2018 |
| WO | 2019025221 A1 | 2/2019 |
| WO | 2019058379 A1 | 3/2019 |
| WO | 2019081135 A1 | 5/2019 |
| WO | 2019151876 A1 | 8/2019 |
| WO | 2019163211 A1 | 8/2019 |
| WO | 2019163212 A1 | 8/2019 |
| WO | 2019174691 A1 | 9/2019 |
| WO | 2019231798 A1 | 12/2019 |

OTHER PUBLICATIONS

International Search Report and Written Opinion from PCT Application No. PCT/US2020/037015, dated Sep. 17, 2020, 16 pgs.

* cited by examiner

ANTI-COLLISION AND MOTION CONTROL SYSTEMS AND METHODS

CROSS-REFERENCES TO RELATED APPLICATIONS

This application claims priority to and the benefit of U.S. Provisional Application No. 62/734,458, entitled "Anti-Collision and Motion Control Systems and Methods," filed Sep. 21, 2018, and U.S. Provisional Application No. 62/859,533, entitled "Anti-Collision and Motion Control Systems and Methods," filed Jun. 10, 2019, both of which are hereby incorporated by reference in their entireties for all purposes.

FIELD OF DISCLOSURE

The present disclosure relates generally to anti-collision and motion control systems and methods. More specifically, embodiments of the present disclosure relate to systems and methods for anti-collision and motion control using light detection and ranging (LiDAR) and high-fidelity camera techniques.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, an anti-collision and motion monitoring system includes one or more light detection and ranging (LiDAR) systems configured to detect locations of one or more objects in an environment. The anti-collision and motion monitoring system also includes one or more camera systems configured to capture images of the one or more objects in the environment that are detected by the one or more LiDAR systems. The anti-collision and motion monitoring system further includes processing circuitry configured to coordinate operation of the one or more LiDAR systems and the one or more camera systems, to receive inputs from the one or more LiDAR systems and the one or more camera systems relating to the one or more objects in the environment, to process the inputs received from the one or more LiDAR systems and the one or more camera systems to determine outputs relating to control of at least one of the one or more objects in the environment, and to communicate the outputs to a central coordinator to control one or more operating parameters of at least one of the one or more objects in the environment based at least in part on the inputs received from the one or more LiDAR systems and the one or more camera systems.

In addition, in certain embodiments, an anti-collision and motion control system includes one or more anti-collision and motion monitoring systems. Each anti-collision and motion monitoring system includes one or more light detection and ranging (LiDAR) systems configured to detect locations of one or more objects in an environment. Each anti-collision and motion monitoring system also includes one or more camera systems configured to capture images of the one or more objects in the environment that are detected by the one or more LiDAR systems. Each anti-collision and motion monitoring system further includes processing circuitry configured to coordinate operation of the one or more LiDAR systems and the one or more camera systems, to receive inputs from the one or more LiDAR systems and the one or more camera systems relating to the one or more objects in the environment, and to process the inputs received from the one or more LiDAR systems and the one or more camera systems to determine outputs relating to control of at least one of the one or more objects in the environment. The anti-collision and motion control system also includes a central coordinator configured to receive the outputs from the processing circuitry of the one or more anti-collision and motion monitoring systems, and to control one or more operating parameters of at least one of the one or more objects in the environment based at least in part on the outputs received from the processing circuitry of the one or more anti-collision and motion monitoring systems.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The anti-collision and motion control system described herein includes fully packaged anti-collision and motion monitoring devices that utilize software algorithms to monitor critical areas within physical environments, and accurately identify and protecting a plurality of different types of objects (e.g., machinery and/or people), whether autonomous or non-autonomous, located within designated areas within the physical environments. In doing so, the anti-collision and motion control system described herein is capable of, for example, triggering alarms, alerting operators, and setting areas within the physical environment to controlled states through communication within equipment located within the physical environment. Using a three-dimensional mapping of the physical environment, the anti-collision and motion monitoring devices are capable of accurately identifying particular objects (e.g., humans, vehicles, pieces of equipment, and so forth), providing a two-step recognition process using light detection and ranging (LiDAR) modules and high-fidelity camera modules, and making decisions according to the particular object's proximity to an area of particular interest within the physical environment. For example, if a determination is made that a human is too close to the area of particular interest, the anti-collision and motion control system may control operating parameters of certain pieces of equipment in the area of particular interest. The anti-collision and motion control system described herein is also capable of detecting operational activities taking place based on multi-object tracking using a mesh network to interface between multiple anti-collision and motion monitoring devices, and accurately delivering movement information, which will enhance the transparency of the operation and its current activity. As such, the anti-collision and motion control system described herein provides a safe and intelligent tracking solution to manage assets in real-time and provide telemetry readings to trend datasets, thereby making facilities safer and environments more manageable.

In addition, the embodiments described herein facilitate the addition of a multitude of anti-collision and motion monitoring devices in a mesh network, wirelessly, in a plug-and-play manner, but also minimize the data transferred between the anti-collision and motion monitoring devices. In other words, instead of having all of the anti-collision and motion monitoring devices transmitting data between all of the other anti-collision and motion monitoring devices in the mesh network, the embodiments described herein intelligently determine what data needs to be transmitted to which other anti-collision and motion monitoring devices in the mesh network for the purpose of enabling the anti-collision and motion control system described herein to provide more robust control of the operations taking place within the physical environment. In addition, because the data processing and transmission requirements of the anti-collision and motion monitoring devices described herein are minimized, the only cables that are required are data cables and, indeed, in certain scenarios, even the data cables may be omitted, with batteries being used in the anti-collision and motion monitoring devices instead.

Figure 1:
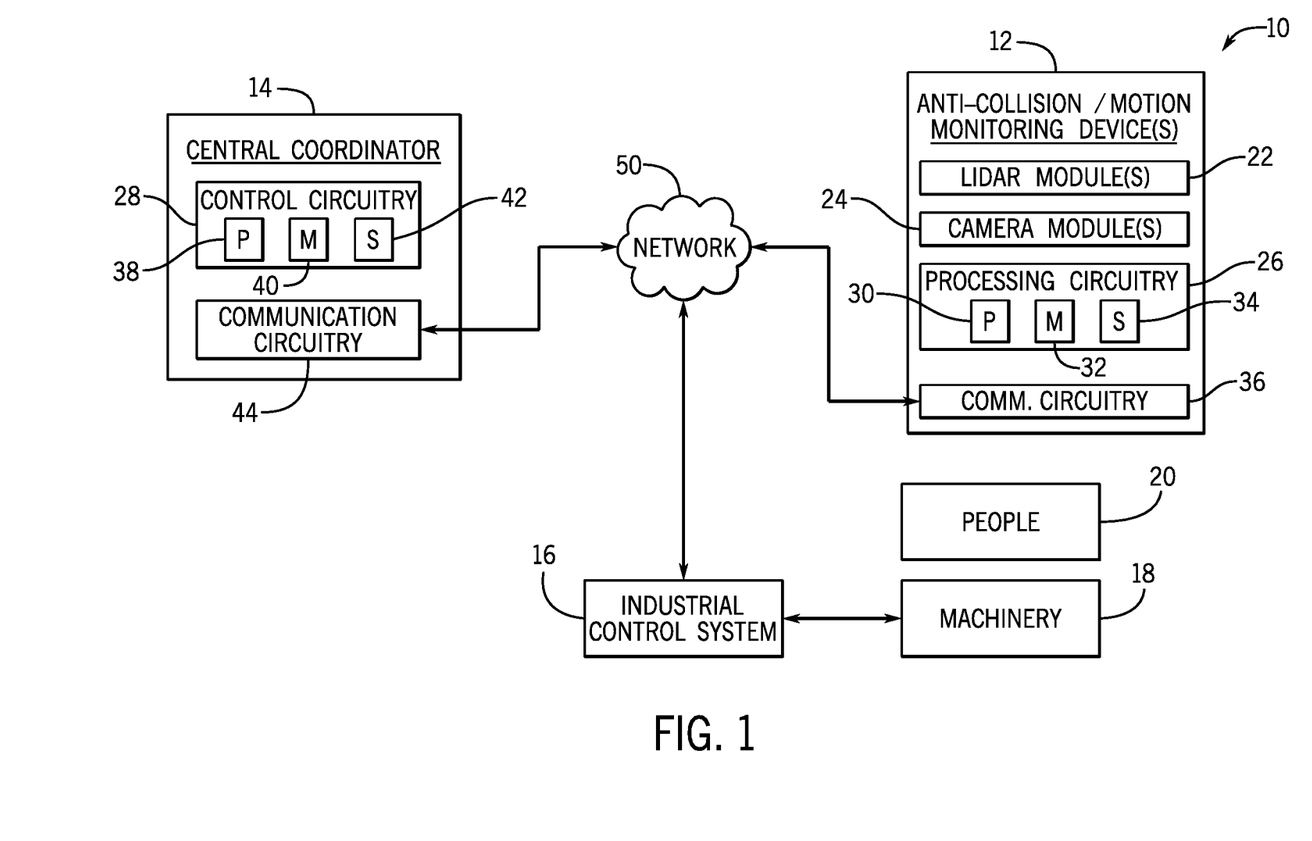
FIG. 1 is a schematic diagram of an anti-collision and motion control system using light detection and ranging (LiDAR) and high-fidelity camera techniques, in accordance with embodiments the present disclosure.

FIG. 1 is a schematic diagram of an anti-collision and motion control system 10 using light detection and ranging (LiDAR) and high-fidelity camera techniques, in accordance with embodiments the present disclosure. In particular, as illustrated in FIG. 1, in certain embodiments, the anti-collision and motion control system 10 may include one or more anti-collision and motion monitoring devices 12 and a central coordinator 14 configured to coordinate operation of the one or more anti-collision and motion monitoring devices 12 and one or more industrial control systems 16 that are used to control operating parameters of machinery 18 disposed in a physical environment being monitored by the one or more anti-collision and motion monitoring devices 12. In addition, in certain embodiments, the central coordinator 14 may be configured to alert people 20 located in the physical environment being monitored by the one or more anti-collision and motion monitoring devices 12, for example, when the people 20 move into areas of the physical environment that the central coordinator 14 believes that the people 20 should not be.

As illustrated in FIG. 1, each anti-collision and motion monitoring device 12 includes one or more light detection and ranging (LiDAR) modules 22, each configured to detect locations of one or more objects (e.g., machinery 18 and/or people 20) located in the physical environment. As also illustrated in FIG. 1, each anti-collision and motion monitoring device 12 includes one or more camera modules 24 configured to capture images of the one or more objects (e.g., machinery 18 and/or people 20) located in the physical environment. In addition, as also illustrated in FIG. 1, each anti-collision and motion monitoring device 12 includes processing circuitry 26 configured to coordinate operation of the one or more LiDAR modules 22 and the one or more camera modules 24 by, for example, receiving inputs from the one or more LiDAR modules 22 and the one or more camera modules 24 relating to the one or more objects (e.g., machinery 18 and/or people 20) located in the physical environment, processing the inputs received from the one or more LiDAR modules 22 and the one or more camera modules 24 to determine outputs relating to control of at least one of the one or more objects (e.g., machinery 18) located in the physical environment, and to communicate the outputs to a central coordinator 14, which includes control circuitry 28 configured to control one or more operating parameters of at least one of the one or more objects (e.g., machinery 18) located in the physical environment based at least in part on the inputs received from the one or more LiDAR modules 22 and the one or more camera modules 24.

As will be appreciated, in certain embodiments, the processing circuitry 26 of the anti-collision and motion monitoring devices 12 may include at least one processor 30, at least one memory medium 32, at least one storage medium 34, or any of a variety of other components that enable the processing circuitry 26 to carry out the techniques described herein. In addition, in certain embodiments, each anti-collision and motion monitoring device 12 may include communication circuitry 36 to facilitate the anti-collision and motion monitoring devices 12 to communicate with each other, as well as with the central coordinator 14, for example. In certain embodiments, the communication circuitry 36 may be configured to facilitate wireless communication and/or wired communication.

The at least one processor 30 of the anti-collision and motion monitoring devices 12 may be any suitable type of computer processor or microprocessor capable of executing computer-executable code. In certain embodiments, the at least one processor 30 of the anti-collision and motion monitoring devices 12 may also include multiple processors that may perform the operations described herein. The at least one memory medium 32 and the at least one storage medium 34 of the anti-collision and motion monitoring devices 12 may be any suitable articles of manufacture that can serve as media to store processor-executable code, data, or the like. These articles of manufacture may represent computer-readable media (e.g., any suitable form of memory or storage) that may store the processor-executable code used by the at least one processor 30 to perform the presently disclosed techniques. As described in greater detail herein, the at least one memory medium 32 and the at least one storage medium 34 of the anti-collision and motion monitoring devices 12 may also be used to store data, various other software applications, and the like. The at least one memory medium 32 and the at least one storage medium 34 of the anti-collision and motion monitoring devices 12 may represent non-transitory computer-readable media (e.g., any suitable form of memory or storage) that may store the processor-executable code used by the at least one processor 30 to perform various techniques described herein. It should be noted that non-transitory merely indicates that the media is tangible and not a signal.

Similarly, in certain embodiments, the control circuitry 28 of the central coordinator 14 may include at least one processor 38, at least one memory medium 40, at least one storage medium 42, or any of a variety of other components that enable the control circuitry 28 to carry out the techniques described herein. In addition, in certain embodiments, the central coordinator 14 may include communication circuitry 44 to facilitate the central coordinator 14 to communicate with the anti-collision and motion monitoring devices 12, for example. In certain embodiments, the communication circuitry 44 may be configured to facilitate wireless communication and/or wired communication.

The at least one processor 38 of the central coordinator 14 may be any suitable type of computer processor or microprocessor capable of executing computer-executable code. In certain embodiments, the at least one processor 38 of the central coordinator 14 may also include multiple processors that may perform the operations described herein. The at least one memory medium 40 and the at least one storage medium 42 of the central coordinator 14 may be any suitable articles of manufacture that can serve as media to store processor-executable code, data, or the like. These articles of manufacture may represent computer-readable media (e.g., any suitable form of memory or storage) that may store the processor-executable code used by the at least one processor 38 to perform the presently disclosed techniques. As described in greater detail herein, the at least one memory medium 40 and the at least one storage medium 42 of the central coordinator 14 may also be used to store data, various other software applications, and the like. The at least one memory medium 40 and the at least one storage medium 42 of the central coordinator 14 may represent non-transitory computer-readable media (e.g., any suitable form of memory or storage) that may store the processor-executable code used by the at least one processor 38 to perform various techniques described herein. It should be noted that non-transitory merely indicates that the media is tangible and not a signal.

Figure 2:
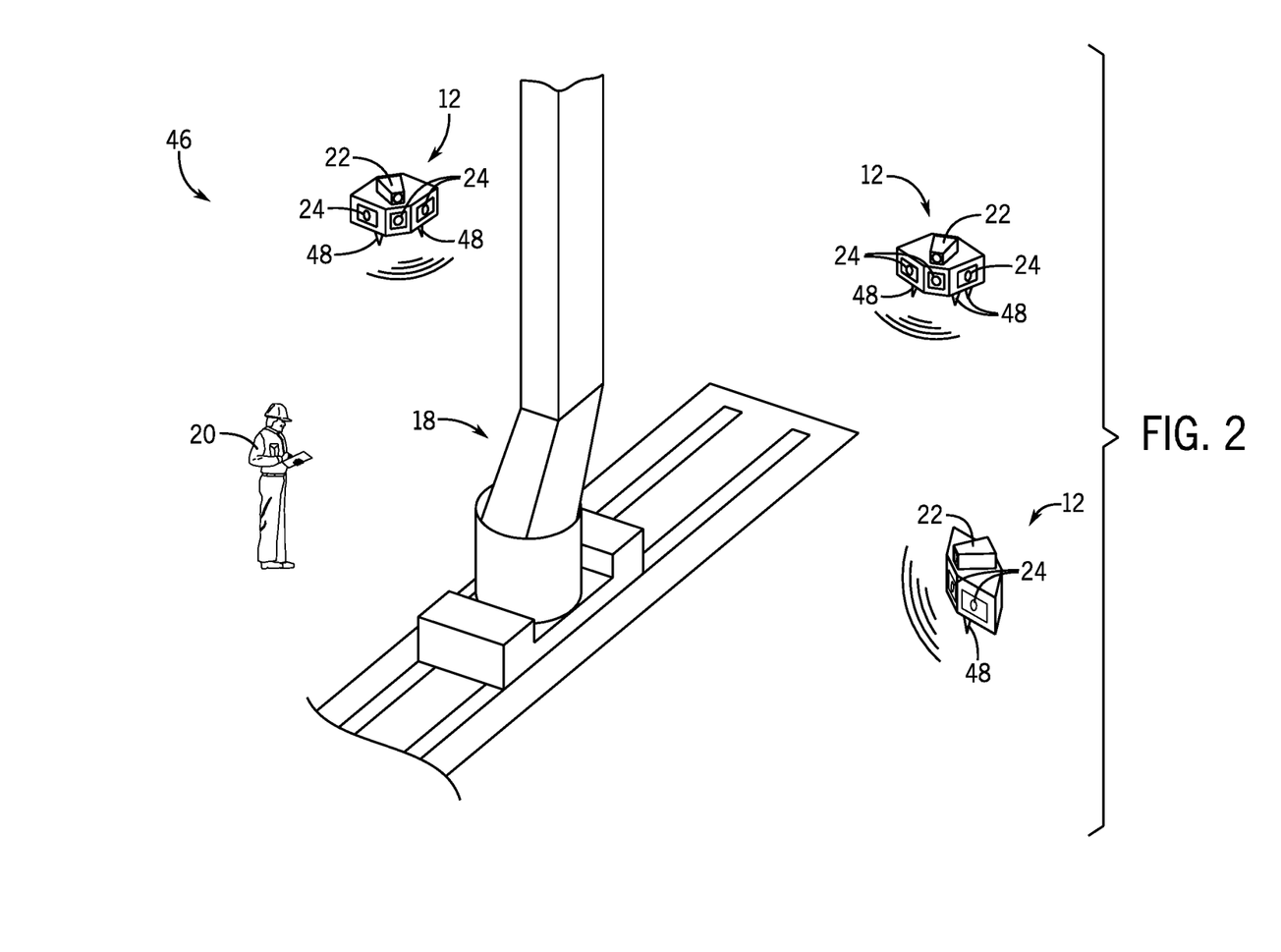
FIG. 2 is a perspective view of a physical environment that may be monitored by the anti-collision and motion control system of FIG. 1, in accordance with embodiments the present disclosure.

To better illustrate the functionality of the anti-collision and motion control system 10 of FIG. 1, FIG. 2 is a perspective view of a physical environment 46 (e.g., a drill rig, a plant floor, and so forth) that may be monitored by the anti-collision and motion control system 10, in accordance with embodiments the present disclosure. As illustrated in FIG. 2, one or more pieces of machinery 18 may be disposed in the physical environment 46, and various people 20 may wander through the physical environment 46, for example, to perform work duties, observe operations within the physical environment 46, and so forth. Although illustrated in FIG. 2 as having four anti-collision and motion monitoring devices 12 monitoring the physical environment 46, in other embodiments, any number of anti-collision and motion monitoring devices 12 may be used to monitor the physical environment 46.

The one or more LiDAR modules 22 of the anti-collision and motion monitoring devices 12 are configured to detect locations of one or more objects (e.g., machinery 18 and/or people 20) located in the physical environment 46. For example, the one or more LiDAR modules 22 of the anti-collision and motion monitoring devices 12 are configured to emit pulses of laser light into the physical environment 46, to detect pulses that are reflected off of the objects (e.g., machinery 18 and/or people 20) located in the physical environment 46, and to determine locations of the objects (e.g., machinery 18 and/or people 20) located in the physical environment 46 based on the reflected pulses. More specifically, the one or more LiDAR modules 22 of the anti-collision and motion monitoring devices 12 are configured to consider return time of the reflected pulses, differences in wavelengths of the reflected pulses, and so forth, to determine a three-dimensional mapping of the physical environment 46, which may be processed by the processing circuitry 26 of the respective anti-collision and motion monitoring device 12 to detect locations of specific objects (e.g., machinery 18 and/or people 20) located in the physical environment 46 and, indeed, to classify the detected objects (e.g., machinery 18 and/or people 20) located in the physical environment 46 based at least in part on the detection performed by the LiDAR modules 22. For example, the processing circuitry 26 may identify the objects (e.g., machinery 18 and/or people 20) located in the physical environment 46 as particular types of machinery 18, specific people 20, and so forth, based at least in part on the detection performed by the LiDAR modules 22.

In addition, the one or more camera modules 24 of the anti-collision and motion monitoring devices 12 are configured to capture images of the one or more objects (e.g., machinery 18 and/or people 20) located in the physical environment 46, which may also be processed by the processing circuitry 26 of the respective anti-collision and motion monitoring device 12 to classify the detected objects (e.g., machinery 18 and/or people 20) located in the physical environment 46 based at least in part on the images captured by the camera modules 24. For example, the processing circuitry 26 may identify the objects (e.g., machinery 18 and/or people 20) located in the physical environment 46 as particular types of machinery 18, specific people 20, and so forth, based at least in part on the images captured by the camera modules 24.

Figure 3:
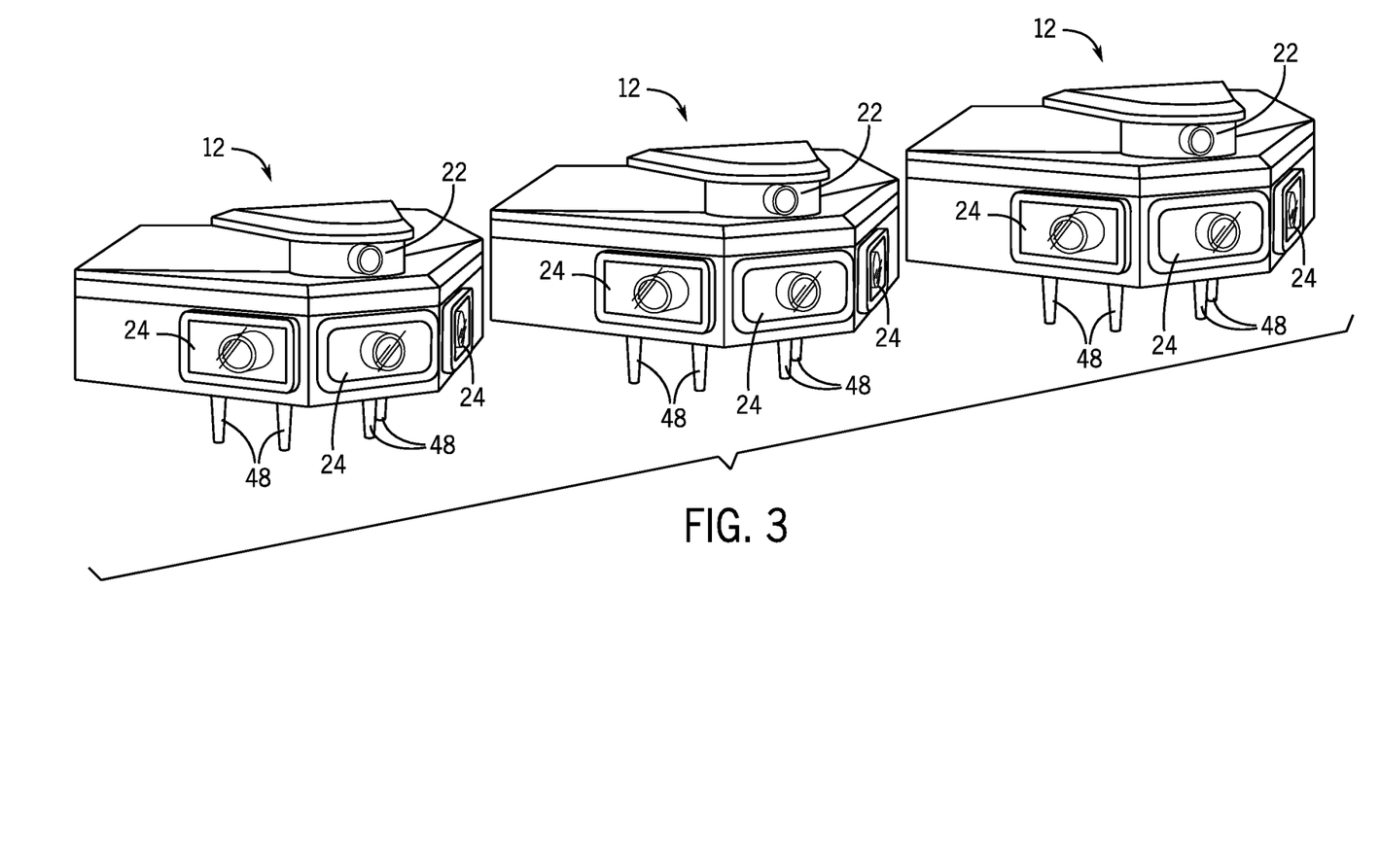
FIG. 3 are perspective views of a plurality of anti-collision and motion monitoring devices of the anti-collision and motion control system of FIG. 1, in accordance with embodiments the present disclosure.

FIG. 3 are perspective views of a plurality of anti-collision and motion monitoring devices 12 of the anti-collision and motion control system 10 of FIG. 1, in accordance with embodiments the present disclosure. As illustrated in FIG. 3, in certain embodiments, the one or more LiDAR modules 22, the one or more camera modules 24, and the processing circuitry 26 of each anti-collision and motion monitoring device 12 may be integrated together within a common housing of the anti-collision and motion monitoring device 12. As such, the anti-collision and motion monitoring devices 12 described herein are fully self-contained packages capable of being deployed in various types of physical environments 46, and coordinated via a central coordinator 14, as illustrated in FIG. 1. In addition, as illustrated in FIG. 3, in certain embodiments, the anti-collision and motion monitoring devices 12 may include a plurality of antennae 48, which may be part of the communication circuitry 36 of the anti-collision and motion monitoring devices 12, as well as serving a secondary function as legs for the anti-collision and motion monitoring devices 12.

Returning now to FIG. 1, the central coordinator 14 of the anti-collision and motion control system 10 may establish a communication network 50 between the various anti-collision and motion monitoring devices 12 monitoring a particular physical environment 46. In other words, the communication circuitry 44 of the central coordinator 14 and the communication circuitry 36 of the various anti-collision and motion monitoring devices 12 monitoring a particular physical environment 46 may each communicate with each other in a non-hierarchical manner (e.g., as a mesh network) in real-time such that each of the components has access to the same data as the others. In certain embodiments, the communication network 50 may be a wireless communication network (e.g., using Wi-Fi, Bluetooth, or other wireless communication techniques) to facilitate rapid and more flexible deployment of the anti-collision and motion monitoring devices 12 in particular physical environments 46.

In certain embodiments, the communication network 50 may include various subnetworks including, but not limited to, a local mesh network and a demilitarized zone (DMZ) network, both of which may communicate with each other via other communication techniques including, but not limited to, one or more firewalls, the Internet, satellite networks, and so forth. In general, the local mesh network may include one or more anti-collision and motion monitoring devices 12, which are deployed in one or more physical environments 46 being monitored by the central coordinator 14, which may be part of the DMZ network, which also may include one or more storage media, such as a central archive storage server. In addition, in certain embodiments, software applications running on computing devices in the DMZ network may, for example, provide visualization functionality related to the monitoring and control provided by the anti-collision and motion control system 10.

In certain embodiments, the central coordinator 14 may include devices and/or software that provide an edge gateway for the one or more anti-collision and motion monitoring devices 12, such that the processing circuitry 26 of the one or more anti-collision and motion monitoring devices 12 may preprocess the data that is collected (e.g., by the respective one or more LiDAR modules 22 and the respective one or more camera modules 24) before providing it to the central coordinator 14. For example, once the processing circuitry 26 of the one or more anti-collision and motion monitoring devices 12 preprocess the data collected by the respective one or more LiDAR modules 22 and the respective one or more camera modules 24, the one or more anti-collision and motion monitoring devices 12 may communicate with the central coordinator 14 via the mesh network, which may in certain embodiments include one or more wireless application protocol (WAP) devices, one or more sensor relays, one or more layer switches, and so forth, which may facilitate communication between the one or more anti-collision and motion monitoring devices 12 and the central coordinator 14 via the mesh network.

It should be noted that, in certain embodiments, the LiDAR modules 22, the camera modules 24, the processing circuitry 26, and/or the communication circuitry 36 of the anti-collision and motion monitoring devices 12 may actually include multiple instances of each, such that the LiDAR modules 22, the camera modules 24, the processing circuitry 26, and/or the communication circuitry 36 are redundant for the anti-collision and motion monitoring devices 12, thereby enhancing the robustness of the anti-collision and motion monitoring devices 12. For example, in certain embodiments, the anti-collision and motion monitoring devices 12 may include two, three, or even more, of the LiDAR modules 22 and of the camera modules 24. In addition, in certain embodiments, the anti-collision and motion monitoring devices 12 may include two or more instances of the processing circuitry 26, In addition, in certain embodiments, the anti-collision and motion monitoring devices 12 may include two or more instances of the communication circuitry 36 as redundant for the purposes of communicating the telemetry data of the objects (e.g., machinery 18 and/or people 20) located in the physical environment 46 via a mesh network, as described herein, as well as two or more instances of the communication circuitry 36 as redundant for the purposes of communicating archive data, backup data, updates, and so forth, between the anti-collision and motion monitoring devices 12 in the mesh network.

Figure 4:
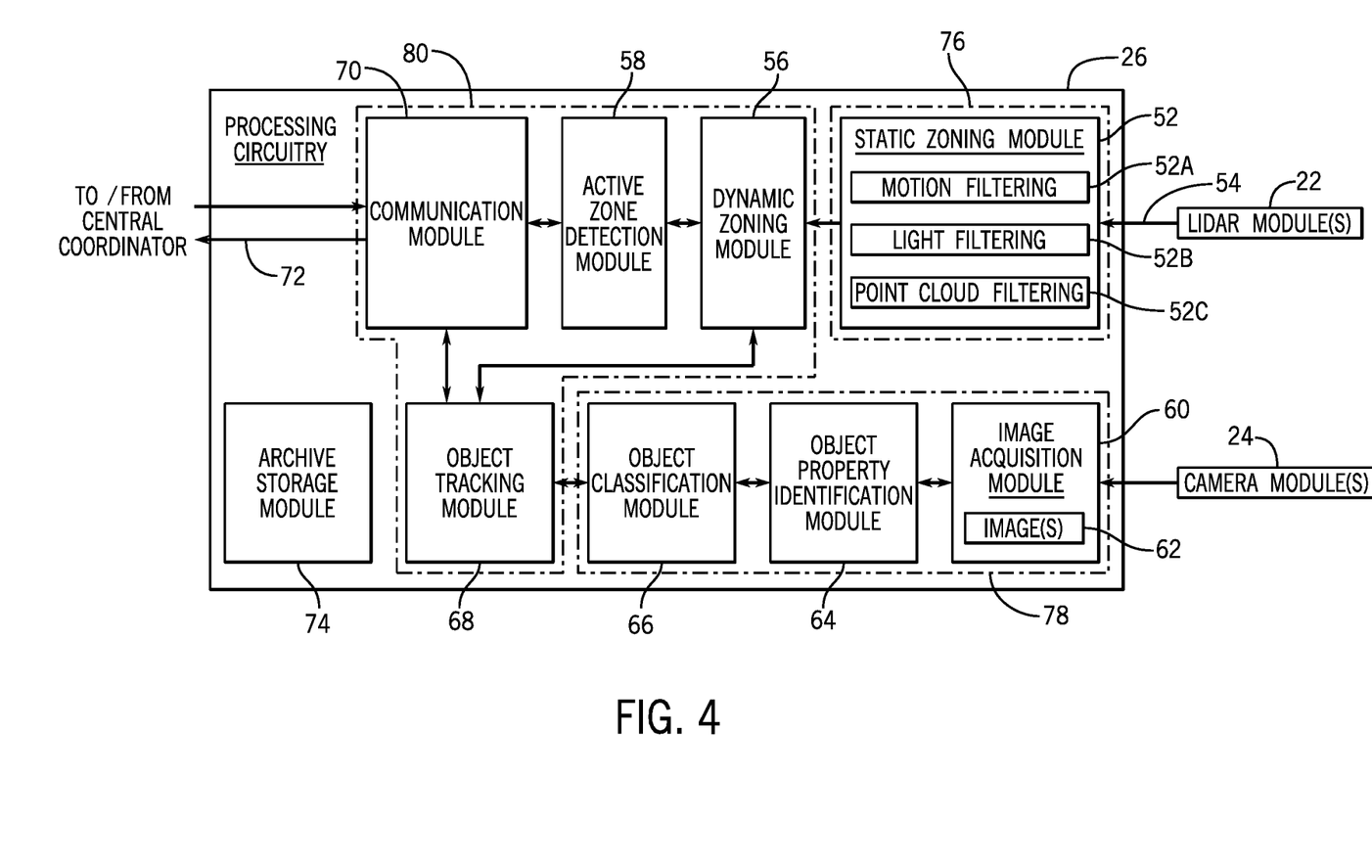
FIG. 4 is a schematic diagram of processing circuitry of the anti-collision and motion monitoring devices, in accordance with embodiments the present disclosure.

FIG. 4 is a schematic diagram of the processing circuitry 26 of the anti-collision and motion monitoring devices 12, in accordance with embodiments the present disclosure. In particular, FIG. 4 illustrates various modules (e.g., hardware modules, software modules, hardware/software modules, and so forth) that are configured, for example, to coordinate operation of the LiDAR modules 22 and the camera modules 24 of the respective anti-collision and motion monitoring device 12, to receive inputs from the LiDAR modules 22 and the camera modules 24 of the respective anti-collision and motion monitoring device 12 relating to objects (e.g., machinery 18 and/or people 20) located in the physical environment 46, to process the inputs received from the LiDAR modules 22 and the camera modules 24 of the respective anti-collision and motion monitoring device 12 to determine outputs relating to control of at least one of the objects (e.g., machinery 18 and/or people 20) located in the physical environment 46, to communicate the outputs to the central coordinator 14 to control one or more operating parameters of at least one of the objects (e.g., machinery 18) located in the physical environment 46 based at least in part on the inputs received from the LiDAR modules 22 and the camera modules 24 of the respective anti-collision and motion monitoring device 12, and so forth.

As illustrated in FIG. 4, in certain embodiments, the processing circuitry 26 may include a static zoning module 52 configured to receive inputs 54 from the LiDAR modules 22 of the respective anti-collision and motion monitoring device 12, and to perform static zoning of locations of objects (e.g., machinery 18 and/or people 20) located in the physical environment 46, which are detected by the LiDAR modules 22. For example, in certain embodiments, the static zoning module 52 may include one or more sub-modules that are configured to perform motion filtering 52A, light filtering 52B, point cloud filtering 52C, and various combinations thereof. In addition, in certain embodiments, the processing circuitry 26 may also include a dynamic zoning module 56 configured to perform dynamic zoning of the locations of the objects (e.g., machinery 18 and/or people 20) located in the physical environment 46, which are detected by the LiDAR modules 22, based on the static zoning performed by the static zoning module 52. In general, the static zoning module 52 and the dynamic zoning module 56 of the processing circuitry 26 are configured to function together to monitor the physical environment 46 for the purpose of aiding in the tracking of the objects (e.g., machinery 18 and/or people 20) located in the physical environment 46. In certain embodiments, the static zoning module 52 may capture snapshots of the physical environment 46 periodically, and may use a point of reference to calibrate the real-time filtering of static objects within the physical environment 46. For example, some identified objects in the physical environment 46 (e.g., windows, wall structures such as beams, and so forth) may be known to never move, and these objects may be used to calibrate the real-time filtering of static objects within the physical environment 46. As such, the amount of computing and the speed of computing may be reduced.

As illustrated in FIG. 4, in certain embodiments, the processing circuitry 26 may also include an active zone detection module 58 configured to determine which zones of a plurality of zones of the physical environment are active (e.g., which currently have, or recently have, had movement of objects occur within them), and the dynamic zoning module 56 may perform the dynamic zoning of the locations of the objects (e.g., machinery 18 and/or people 20) located in the physical environment 46 based at least in part on the active zones in the physical environment 46, which are determined by the active zone detection module 58. For example, in certain embodiments, the active zone detection module 58 may determine the active zones in the physical environment 46 based on the object tracking performed by the processing circuitry 26, as described herein, and/or based on communications with the central coordinator 14. In other words, in certain embodiments, the active zones in the physical environment 46 may be based on detection of recent motion within the physical environment 46, may be predetermined by the central coordinator 14, may be predetermined by the central coordinator 14 but modified upon detection of recent motion within the physical environment 46, and so forth. The ability to only perform dynamic zoning of active zones, as determined by the active zone detection module 58, may reduce the processing cycles required by the dynamic zoning module 56, as well as reduce the amount of data that will be communicated to the central coordinator 14.

In addition, in certain embodiments, the processing circuitry 26 may include an image acquisition module 60 configured to acquire images 62 of the objects (e.g., machinery 18 and/or people 20) located in the physical environment 46, which are captured by the camera modules 24 of the respective anti-collision and motion monitoring device 12. In addition, in certain embodiments, the processing circuitry 26 may also include an object property identification module 64 configured to identify properties (e.g., identification of object types, such as types of machinery, whether the object is a person, whether the object is stationary or in motion, and so forth) of at least one of the objects (e.g., machinery 18 and/or people 20) located in the physical environment 46 based at least in part on the images 62 acquired by the image acquisition module 60. In addition, in certain embodiments, the processing circuitry 26 may also include an object classification module 66 configured to classify at least one of the objects (e.g., machinery 18 and/or people 20) located in the physical environment 46 based at least in part on the images 62 acquired by image acquisition module 60. In addition, in certain embodiments, the processing circuitry 26 may also include an object tracking module 68 configured to track location, orientation, or motion of at least one of the objects (e.g., machinery 18 and/or people 20) located in the physical environment 46 based at least in part on the images 62 acquired by image acquisition module 60. In addition, in certain embodiments, the object tracking module 68 may be configured to track location, orientation, or motion of at least one of the objects (e.g., machinery 18 and/or people 20) located in the physical environment 46 based at least in part on input from the dynamic zoning module 56 of the processing circuitry 26.

In addition, in certain embodiments, the processing circuitry 26 may include a communication module 70 configured to communicate (e.g., wirelessly via the communication circuitry 36, in certain embodiments; however, wired communication may also be used) outputs 72 from the processing circuitry 26 to the central coordinator 14 and, in certain embodiments, to processing circuitry 26 of other anti-collision and motion monitoring devices 12. For example, in certain embodiments, the outputs 72 may be communicated between the various anti-collision and motion monitoring devices 12 (e.g., via a mesh network) to reduce network latency, for example. In such embodiments, one of the anti-collision and motion monitoring devices 12 may function as a master for all of the other anti-collision and motion monitoring devices 12 such that the master anti-collision and motion monitoring device 12 coordinates the communication of outputs 72 from the various other anti-collision and motion monitoring devices 12 to the central coordinator 14. Furthermore, in certain embodiments, the anti-collision and motion monitoring devices 12 may only make requests of data from other anti-collision and motion monitoring devices 12 when that particular data is needed for the processing of the particular anti-collision and motion monitoring device 12, in order to minimize the amount of data being transferred via the mesh network. For example, in certain embodiments, if one anti-collision and motion monitoring device 12 is tracking a particular object, but loses a line-of-sight of the object, that particular anti-collision and motion monitoring device 12 may send a request to another anti-collision and motion monitoring device 12 to provide data relating to the object for which the line-of-sight has been lost.

In certain embodiments, at least some of the outputs 72 communicated to the central coordinator 14 from an anti-collision and motion monitoring device 12 may relate to the location, orientation, or motion of at least one of the objects (e.g., machinery 18 and/or people 20) located in the physical environment 46 (i.e., telemetry data of the objects), which is tracked by the object tracking module 68 of the anti-collision and motion monitoring device 12. Furthermore, in certain embodiments, the communication module 70 may be configured to receive information from the central coordinator 14, such as which zones of the physical environment 46 are active (e.g., for input into the active zone detection module 58 of the processing circuitry 26). In addition, in certain embodiments, the processing circuitry 26 may include an archive storage module 74 configured to store data from any of the various modules of the processing circuitry 26 (e.g., data relating to the inputs 54 from the LiDAR modules 22, data relating to the images 62 captured by the camera modules 24 and acquired by the image acquisition module 60, data relating to outputs 72 communicated to the central coordinator 14, or any other data processed by the various modules of the processing circuitry 26).

In general, the various modules of the processing circuitry 26 of the anti-collision and motion monitoring devices 12 may be considered as distinct processing groups of modules that cooperate with each other for the purpose of tracking objects (e.g., machinery 18 and/or people 20) located in the physical environment 46. For example, the static zoning module 52 may be considered as part of a LiDAR processing group 76 of modules, the image acquisition module 60, the object property identification module 64, and the object classification module 66 may be considered as part of an image processing group 78 of modules, and the dynamic zoning module 56, the active zone detection module 58, the object tracking module 68, and the communication module 70 may be considered as part of a core processing group 80 of modules.

In addition, in certain embodiments, the processing circuitry 26 of the anti-collision and motion monitoring devices 12 may include other, or different, modules not shown in FIG. 4. For example, in certain embodiments, the LiDAR processing group 76 of modules may include an object property identification module 64 and an object classification module 66 (e.g., between the static zoning module 52 and the dynamic zoning module 56) instead of, or in addition to, the object property identification module 64 and the object classification module 66 of the image processing group 78 of modules, which may perform object property identification and object classification, respectively, based on the inputs 54 from the LiDAR modules 22, instead of based on the images 62 acquired by the image acquisition module 60. In such embodiments, the object property identification module 64 and the object classification module 66 of the LiDAR processing group 76 of modules may be used to check the results of the object property identification module 64 and the object classification module 66 of the image processing group 78 of modules and/or to calibrate the processing of the object property identification module 64 and the object classification module 66 of the image processing group 78 of modules.

In addition, in certain embodiments, in the interest of reducing the processing required of the various modules of the processing circuitry 26 of the anti-collision and motion monitoring devices 12, as well as reduce the amount of data being transferred via the mesh network, in certain embodiments, certain of the modules of the processing circuitry 26 may not continually perform their processing, but may rather only perform their particular processing tasks when requested by one of the other modules of the processing circuitry 26. As but one non-limiting example, in certain embodiments, once an object has been classified by the object classification module 66, the object classification module 66 may not be requested to classify any other objects until additional motion (e.g., not relating to any presently classified objects) is detected by the static and dynamic zoning modules 52, 56 and/or when the object tracking module 68 requests that an object be re-identified (e.g., in a situation where the object disappears from a line-of-sight of the particular anti-collision and motion monitoring device 12 temporarily).

Figure 5:
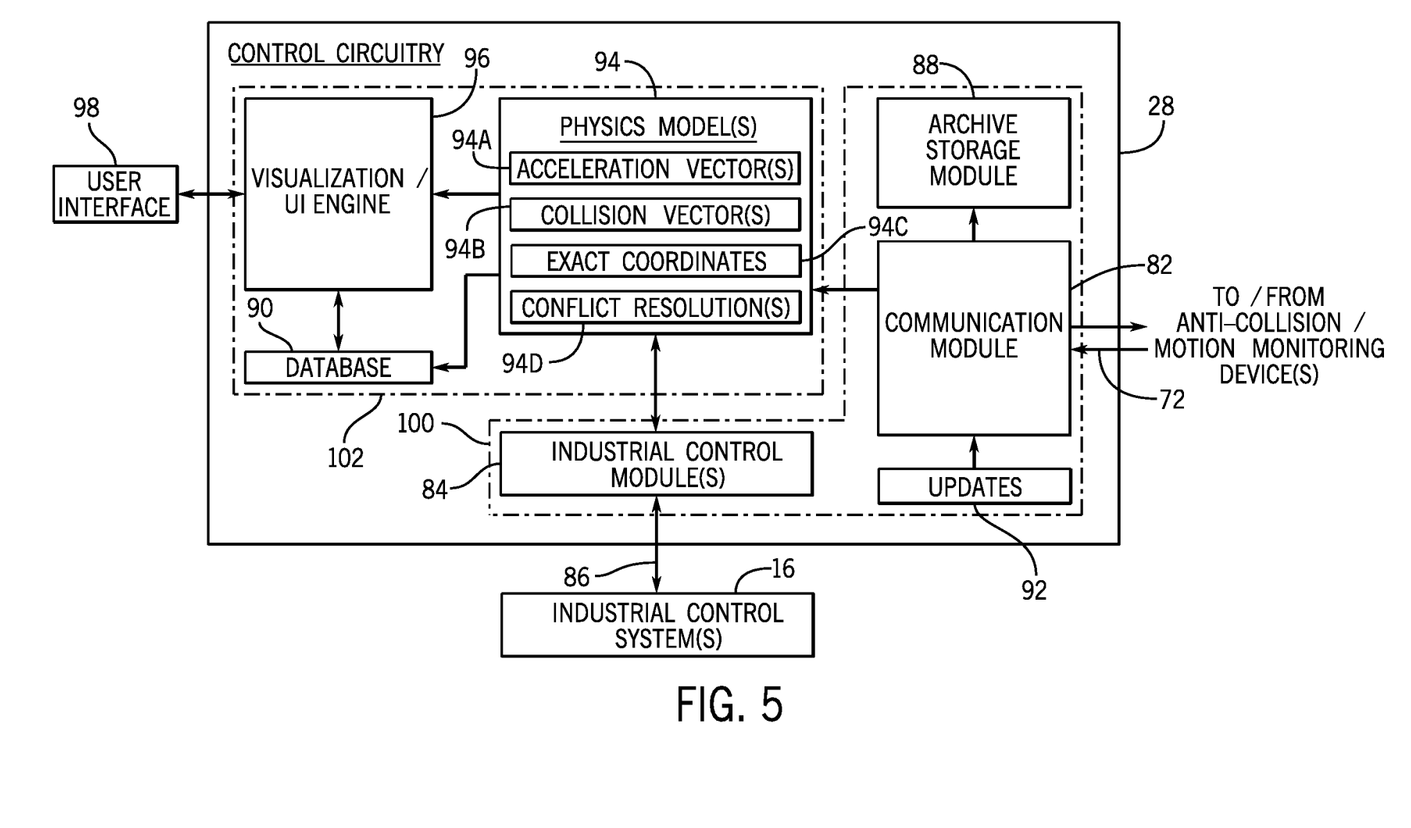
FIG. 5 is a schematic diagram of control circuitry of the central coordinator, in accordance with embodiments the present disclosure.

FIG. 5 is a schematic diagram of the control circuitry 28 of the central coordinator 14, in accordance with embodiments the present disclosure. In particular, FIG. 5 illustrates various modules (e.g., hardware modules, software modules, hardware/software modules, and so forth) that are configured, for example, to receive the outputs 72 from the processing circuitry 26 of the one or more anti-collision and motion monitoring devices 12, and to control one or more operating parameters of at least one of the objects (e.g., machinery 18) located in the physical environment 46 based at least in part on the outputs 72 received from the processing circuitry 26 of the one or more anti-collision and motion monitoring devices 12.

For example, as illustrated in FIG. 5, in certain embodiments, the control circuitry 28 may include a communication module 82 configured to receive (e.g., wirelessly via the communication circuitry 44, in certain embodiments; however, wired communication may also be used) the outputs 72 from the processing circuitry 26 of the one or more anti-collision and motion monitoring devices 12. Indeed, the communication module 82 of the control circuitry 28 may be configured to bi-directionally communicate with the communication modules 70 of the one or more anti-collision and motion monitoring devices 12 to transfer data between the central coordinator 14 and the one or more anti-collision and motion monitoring devices 12, as described in greater detail herein.

In addition, in certain embodiments, the control circuitry 28 may include one or more industrial control module(s) 84 configured to communicate control signals 86 (e.g., stop commands, and so forth) to one or more industrial control systems 16 to control one or more operating parameters of at least one of the objects (e.g., machinery 18) located in the physical environment 46 based at least in part on the outputs 72 received from the one or more anti-collision and motion monitoring devices 12 and/or based at least in part on information from one or more physics models, as described in greater detail herein. In addition, in certain embodiments, the industrial control module(s) 84 may be configured to perform control system validation. For example, in certain embodiments, the industrial control module(s) 84 may receive feedback signals from the industrial control systems 16 during operation of the industrial control systems 16, which may be used to validate the control signals 86 that are being communicated to the industrial control systems 16 are effecting the one or more operating parameters of the objects (e.g., machinery 18) located in the physical environment 46 that are being controlled. In addition, in certain embodiments, positioning encoders in the industrial control systems 16 may provide information relating to locations of the industrial control systems 16 within the physical environment 46, and the industrial control module(s) 84 may be configured to validate this location information based on object tracking performed by the control circuitry 28.

In addition, in certain embodiments, the control circuitry 28 may also include an archive storage module 88 configured to store data from any of the various modules of the control circuitry 28 (e.g., data relating to the outputs 72 received from the one or more anti-collision and motion monitoring devices 12, data relating to the control signals 86 communicated to the ICSs, or any other data processed by the various modules of the control circuitry 28). For example, in certain embodiments, as the outputs 72 from the one or more anti-collision and motion monitoring devices 12 (e.g., the telemetry data relating to one or more tracked objects) are received by the communication module 82, raw data relating to the outputs 72 may be stored in the archive storage module 88, and the raw data may be processed by the control circuitry 28, as described in greater detail herein, and the processed data may be stored in a separate database 90. In certain embodiments, the raw data may also be synched to cloud storage, for example. In addition, in certain embodiments, the control circuitry 28 may be configured to communicate software updates 92 to the processing circuitry 26 of the one or more anti-collision and motion monitoring devices 12.

In addition, in certain embodiments, the control circuitry 28 may be configured to control one or more operating parameters of at least one of the objects (e.g., machinery 18) located in the physical environment 46 based at least in part on one or more physics models 94, for example, stored in memory of the control circuitry 28. For example, in certain embodiments, the control circuitry 28 may be configured to control one or more operating parameters of at least one of the objects (e.g., machinery 18) located in the physical environment 46 based at least in part on one or more acceleration vectors 94A relating to at least one of the objects (e.g., machinery 18 and/or people 20) located in the physical environment 46. In addition, in certain embodiments, the control circuitry 28 may be configured to control one or more operating parameters of at least one of the objects (e.g., machinery 18) located in the physical environment 46 based at least in part on one or more collision vectors 94B relating to at least one of the objects (e.g., machinery 18 and/or people 20) located in the physical environment 46. In addition, in certain embodiments, the control circuitry 28 may be configured to control one or more operating parameters of at least one of the objects (e.g., machinery 18) located in the physical environment 46 based at least in part on one or more exact coordinates 94C of at least one of the objects (e.g., machinery 18 and/or people 20) located in the physical environment 46. In addition, in certain embodiments, the control circuitry 28 may be configured to control one or more operating parameters of at least one of the objects (e.g., machinery 18) located in the physical environment 46 based at least in part on one or more conflict resolutions 94D relating to at least one of the objects (e.g., machinery 18 and/or people 20) located in the physical environment 46.

In certain embodiments, the one or more physics models 94 may enable the control circuitry 28 to predict a future location, orientation, or motion of at least one of the objects (e.g., machinery 18 and/or people 20) located in the physical environment 46 based at least in part on previous location, orientation, or motion of the at least one of the objects (e.g., machinery 18 and/or people 20) located in the physical environment 46. For example, in certain embodiments, the one or more physics models 94 may include data relating to movement trajectories that are commonly tracked for a particular object (e.g., machinery 18 and/or people 20) that has been identified by the object property identification module 64 of the processing circuitry 26 of the one or more anti-collision and motion monitoring devices 12, for example, and the control circuitry 28 may use the data relating to the movement trajectories to predict a future location, orientation, or motion of the particular object. For example, a certain identified person 20 may have common movement patterns while in the physical environment 46 (e.g., while inspecting the machinery 18). Similarly, a certain piece of machinery 18 may have common movement patterns during operation. These types of common movement patterns may be used by the control circuitry 28 to predict future location, orientation, or motion of the particular object, which may be used to control one or more operating parameters of at least one of the objects (e.g., machinery 18) located in the physical environment 46, as described in greater detail herein.

In addition, in certain embodiments, the control circuitry 28 may include a visualization/UI engine 96 configured to provide one or more visualizations of the physical environment 46 to a user interface 98 communicatively coupled to the central coordinator 14. In particular, the visualization/UI engine 96 may provide an application program interface (API) that the user interface 98 may access in order to provide the one or more visualizations of the physical environment 46 based at least in part on the processed data stored in the database 90, for example.

Similar to the processing circuitry 26 of the anti-collision and motion monitoring devices 12, the various modules of the control circuitry 28 of the central coordinator 14 may be considered as distinct processing groups of modules that cooperate with each other for the purpose of controlling objects (e.g., machinery) located in the physical environment 46. For example, the communication module 82, the archive storage module 88, and the industrial control module(s) 84 may be considered as part of a data processing control group 100 of modules, and the database 90, the physics models 94, and the visualization/UI engine 96 may be considered as part of a UI group 102 of modules.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An anti-collision and motion monitoring device, comprising:
   a common housing;
   one or more light detection and ranging (LiDAR) systems integrated within the common housing and configured to detect locations of one or more objects in an environment;
   one or more camera modules integrated within the common housing and configured to capture images of the one or more objects in the environment that are detected by the one or more LiDAR modules; and
   a processing circuitry integrated within the common housing, configured to:
   coordinate operation of the one or more LiDAR modules and the one or more camera modules integrated within the common housing,
   receive input data from the one or more LiDAR modules and the one or more camera modules relating to the one or more objects in the environment,
   process the input data to determine output data relating to control of at least one of the one or more objects in the environment,
   communicate with other anti-collision and motion monitoring devices in a non-hierarchical manner in real-time such that each anti-collision and motion monitoring device has access to the input data and output data, wherein the one or more objects in the environment are objects other than the other anti-collision and motion monitoring devices, and
   communicate the output data to a central coordinator to control one or more operating parameters of at least one of the one or more objects in the environment based at least in part on the input data received from the one or more LiDAR modules and the one or more camera modules.

2. The anti-collision and motion monitoring device of claim 1, wherein the processing circuitry is configured to perform static zoning of the locations of the one or more objects in the environment detected by the one or more LiDAR modules.

3. The anti-collision and motion monitoring device of claim 2, wherein the static zoning of the locations of the one or more objects in the environment comprises motion filtering, light filtering, point cloud filtering, or some combination thereof.

4. The anti-collision and motion monitoring device of claim 1, wherein the processing circuitry is configured to perform dynamic zoning of the locations of the one or more objects in the environment detected by the one or more LiDAR modules.

5. The anti-collision and motion monitoring device of claim 1, wherein the processing circuitry is configured to identify properties of at least one of the one or more objects in the environment.

6. The anti-collision and motion monitoring device of claim 5, wherein the processing circuitry is configured to classify at least one of the one or more objects in the environment.

7. The anti-collision and motion monitoring device of claim 6, wherein the processing circuitry is configured to track location, orientation, or motion of at least one of the one or more objects in the environment.

8. The anti-collision and motion monitoring device of claim 1, wherein the processing circuitry is configured to wirelessly communicate the output data to the central coordinator.

9. The anti-collision and motion monitoring device of claim 1, wherein the processing circuitry is configured to store data relating to the input data received from the one or more LiDAR modules and the one or more camera modules in storage media of the anti-collision and motion monitoring device.

10. An anti-collision and motion control system, comprising:
a plurality of anti-collision and motion monitoring devices, each anti-collision and motion monitoring device comprising:
a common housing;
one or more light detection and ranging (LiDAR) systems integrated within the common housing and configured to detect locations of one or more objects in an environment;
one or more camera modules integrated within the common housing and configured to capture images of the one or more objects in the environment that are detected by the one or more LiDAR modules;
a processing circuitry integrated within the common housing and configured to coordinate operation of the one or more LiDAR modules and the one or more camera modules integrated within the common housing, to receive input data from the one or more LiDAR modules and the one or more camera modules relating to the one or more objects in the environment, to process the input data received from the one or more LiDAR modules and the one or more camera modules to determine output data relating to control of at least one of the one or more objects in the environment, and to communicate with other anti-collision and motion monitoring devices in a non-hierarchical manner in real-time such that each anti-collision and motion monitoring device has access to the input data and output data; and
a central coordinator configured to receive the output data from the processing circuitry of the plurality of anti-collision and motion monitoring devices, and to control one or more operating parameters of at least one of the one or more objects in the environment based at least in part on the output data received from the processing circuitry of the plurality of anti-collision and motion monitoring devices.

11. The anti-collision and motion control system of claim 10, wherein the central coordinator is configured to wirelessly receive the output data from the processing circuitry of the plurality of anti-collision and motion monitoring devices.

12. The anti-collision and motion control system of claim 10, wherein the central coordinator is configured to communicate with one or more industrial control systems to control the one or more operating parameters.

13. The anti-collision and motion control system of claim 10, wherein the central coordinator is configured to control one or more operating parameters of at least one of the one or more objects in the environment based at least in part on acceleration vectors relating to at least one of the objects in the environment.

14. The anti-collision and motion control system of claim 10, wherein the central coordinator is configured to control one or more operating parameters of at least one of the one or more objects in the environment based at least in part on collision vectors relating to at least one of the objects in the environment.

15. The anti-collision and motion control system of claim 10, wherein the central coordinator is configured to control one or more operating parameters of at least one of the one or more objects in the environment based at least in part on exact coordinates of at least one of the objects in the environment.

16. The anti-collision and motion control system of claim 10, wherein the central coordinator is configured to control one or more operating parameters of at least one of the one or more objects in the environment based at least in part on conflict resolution relating to at least one of the objects in the environment.

17. The anti-collision and motion control system of claim 10, wherein the central coordinator is configured to provide visualization of the environment to a user interface communicatively coupled to the central coordinator.

18. The anti-collision and motion control system of claim 10, wherein the central coordinator is configured to communicate software updates to the processing circuitry of the plurality of anti-collision and motion monitoring devices.

19. The anti-collision and motion control system of claim 10, wherein the central coordinator is configured to store data relating to the output data received from the processing circuitry of the plurality of anti-collision and motion monitoring devices in storage media of the central coordinator.

20. An anti-collision and motion monitoring device, comprising:
a common housing;
one or more light detection and ranging (LiDAR) systems integrated within the common housing and configured to detect locations of one or more objects in an environment;
one or more camera modules integrated within the common housing and configured to capture images of the one or more objects in the environment that are detected by the one or more LiDAR modules; and
a processing circuitry integrated within the common housing, configured to:
coordinate operation of the one or more LiDAR modules and the one or more camera modules integrated within the common housing, receive input data from the one or more LiDAR modules and the one or more camera modules relating to the one or more objects in the environment, process the input data to determine output data relating to control of at least one of the one or more objects in the environment, communicate with other anti-collision and motion monitoring devices in a non-hierarchical manner in real-time such that each anti-collision and motion monitoring device has access to the input data and output data, communicate the output data to a central coordinator to control one or more operating parameters of at least one of the one or more objects in the environment based at least in part on the input data received from the one or more LiDAR modules and the one or more camera modules, perform dynamic zoning of the locations of the one or more objects in the environment detected by the one or more LiDAR modules, determine which zones of a plurality of zones of the environment are active, and perform the dynamic zoning of the locations of the one or more objects in the environment detected by the one or more LiDAR modules based at least in part on the determination of the active zones.

\* \* \* \* \*